(No Model.)

J. H. SEED.
WATER STRAINER.

No. 575,177. Patented Jan. 12, 1897.

WITNESSES:
Edward Thorpe
Theo. G. Hoster

INVENTOR
J. H. Seed
BY
ATTORNEYS.

UNITED STATES PATENT OFFICE.

JOSEPH H. SEED, OF BROOKLYN, NEW YORK.

WATER-STRAINER.

SPECIFICATION forming part of Letters Patent No. 575,177, dated January 12, 1897.

Application filed July 21, 1896. Serial No. 600,052. (No model.)

*To all whom it may concern:*

Be it known that I, JOSEPH H. SEED, of Brooklyn, in the county of Kings and State of New York, have invented a new and Improved Water-Strainer, of which the following is a full, clear, and exact description.

The object of the invention is to provide a new and improved water-strainer more especially designed for use in the ordinary faucets held on the service-pipes in buildings, the strainer serving to purify the water in a very simple and inexpensive manner.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1:
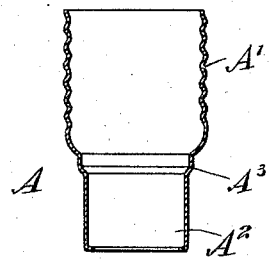
Figure 2:
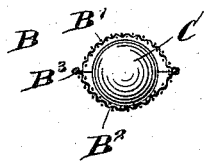
Figure 3:
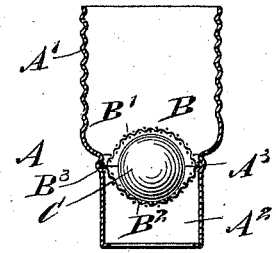
Figure 4:
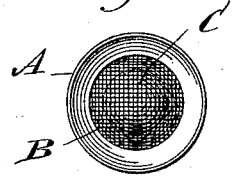

Figure 1 is a sectional side elevation of the casing. Fig. 2 is a sectional side elevation of the spherical strainer. Fig. 3 is a sectional side elevation of the improvement, and Fig. 4 is a plan view of the same.

The improved water-strainer is provided with a casing A, formed with an upper threaded portion A′, adapted to screw on an ordinary faucet on the service-pipe in a building, and the lower portion $A^2$ of the casing forms an outlet or spout for the water. At the junction of the upper and lower parts A′ and $A^2$ is arranged a strainer B approximately spherical in shape and formed of two sieves B′ $B^2$, respectively made semispherical and united at their bases to form an external annular rim $B^3$, engaging a correspondingly-shaped seat or recess $A^3$, formed in the casing A. The sieves B′ and $B^2$ are preferably of different mesh, the upper sieve being made of wire-cloth of a fine mesh and the lower sieve made of perforated material.

A ball C, of agate or like hard and impervious material, is held loosely in the spherical strainer B, the said ball being inserted at the time the two sieves are united with each other. Now it will be seen that by the arrangement described the water flowing down through the casing must pass through the meshes in the strainer B, so that impurities contained in the water are retained within the casing, and consequently the water discharged at the lower portion $A^2$ is purified and in a healthy condition.

When it is desired to clean the strainer, then the operator simply unscrews the entire device from the faucet, reverses the strainer, and holds the end $A^2$ in a stream of water to cause the latter to wash the accumulated impurities out of the strainer at the threaded end A′.

In making the device the casing A and the strainer B are made separately, and then the strainer is placed in the casing, and the latter is formed with the seat $A^3$ by spinning the casing in a suitable machine or otherwise forming the said seat. Thus the strainer B is securely fastened in place in the casing A.

By having the ball C within the strainer B the sieves, especially the upper one B′, are not liable to collapse, no matter how much pressure the sieve is subjected to. Furthermore, the ball C provides a convexed surface whereon to receive a split stream of water. This breaks the impetuosity of the flow and decreases the splashing on the bottom of the receptacle below.

Having thus described my invention, I claim as new and desire to secure by Letters Patent—

1. A strainer having a casing, two semispherical sieves having their bases united to form a flange attached to the casing whereby to hold the sieves within the casing, and a hard impervious sphere held within the sieves, substantially as described.

2. A strainer having a casing, an approximately spherical sieve held within the casing, and a hard impervious sphere inclosed by the sieve, substantially as described.

3. A strainer having an approximately spherical sieve, and a hard impervious ball held within the sieve, substantially as described.

JOSEPH H. SEED.

Witnesses:
  THEO. G. HOSTER,
  JNO. M. RITTER.